United States Patent
Noda et al.

(10) Patent No.: US 10,204,713 B2
(45) Date of Patent: Feb. 12, 2019

(54) EMERGENCY DECISION-MAKING ASSISTANCE SYSTEM

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 112 days.

(21) Appl. No.: 15/109,513

(22) PCT Filed: Sep. 4, 2014

(86) PCT No.: PCT/JP2014/073329
§ 371 (c)(1),
(2) Date: Jul. 1, 2016

(87) PCT Pub. No.: WO2015/102061
PCT Pub. Date: Jul. 9, 2015

(65) Prior Publication Data
US 2016/0329117 A1 Nov. 10, 2016

(30) Foreign Application Priority Data
Jan. 6, 2014 (JP) .................. 2014-000378

(51) Int. Cl.
*G06F 15/16* (2006.01)
*G21D 3/04* (2006.01)
(Continued)

(52) U.S. Cl.
CPC ........... *G21D 3/04* (2013.01); *G05B 23/0272* (2013.01); *G06F 3/04883* (2013.01);
(Continued)

(58) Field of Classification Search
CPC .... G21D 3/04; G21D 3/008; G21D 2003/007; G05B 23/0272; G06F 3/04883;
(Continued)

(56) References Cited

U.S. PATENT DOCUMENTS

2002/0116242 A1* 8/2002 Vercellone ............ G06Q 10/06
705/7.13
2005/0240430 A1* 10/2005 Baum .................. G06Q 90/205
705/324
(Continued)

FOREIGN PATENT DOCUMENTS

JP 10-334078 A 12/1998
JP 11-15875 A 1/1999
(Continued)

OTHER PUBLICATIONS

Gen, "Shinayaka IT" de Bosai, Nikkei Computer, Sep. 13, 2012, No. 817, pp. 58-66, cited in ISR (11 pages).
(Continued)

*Primary Examiner* — Wing F Chan
*Assistant Examiner* — Joseph R Maniwang
(74) *Attorney, Agent, or Firm* — Westerman, Hattori, Daniels & Adrian, LLP

(57) ABSTRACT

An emergency decision-making assistance system includes an information management unit operable to generate display data on the basis of emergency information and to share the emergency information via a network; a display unit operable to display a plurality of pieces of the display data generated by the information management unit; a console unit operable to switch between the plurality of pieces of display data displayed on the display unit; and a database configured to store the plurality of pieces of display data generated by the information management unit. Decision-
(Continued)

making is thereby effectively assisted by obtaining only necessary information in a plurality of sites.

16 Claims, 7 Drawing Sheets

(51) Int. Cl.
*G21D 3/00* (2006.01)
*G05B 23/02* (2006.01)
*G06Q 10/10* (2012.01)
*G06F 3/0488* (2013.01)
*H04L 29/08* (2006.01)
*G06Q 50/06* (2012.01)

(52) U.S. Cl.
CPC ............ *G06Q 10/10* (2013.01); *G21D 3/008* (2013.01); *H04L 67/1095* (2013.01); *G06Q 50/06* (2013.01); *G21D 2003/007* (2013.01); *Y02E 30/40* (2013.01)

(58) Field of Classification Search
CPC .... G06Q 10/10; G06Q 50/06; H04L 67/1095; Y02E 30/40
USPC ......................................................... 709/204
See application file for complete search history.

(56) References Cited

U.S. PATENT DOCUMENTS

| | | | | |
|---|---|---|---|---|
| 2006/0265489 | A1* | 11/2006 | Moore | H04L 67/1095 709/223 |
| 2007/0033095 | A1* | 2/2007 | Hodgin | G06Q 10/063 705/7.28 |
| 2008/0177688 | A1* | 7/2008 | Friedlander | G06N 7/08 706/46 |
| 2011/0258238 | A1* | 10/2011 | Ohba | G01W 1/00 707/804 |
| 2013/0106748 | A1* | 5/2013 | Hosaka | G06F 3/0488 345/173 |
| 2015/0264547 | A1 | 9/2015 | Kobayashi | |

FOREIGN PATENT DOCUMENTS

| | | | |
|---|---|---|---|
| JP | 2002-62393 | A | 2/2002 |
| JP | 2002-230238 | A | 8/2002 |
| JP | 2002-319086 | A | 10/2002 |
| JP | 2003-177666 | A | 6/2003 |
| JP | 2004-295729 | A | 10/2004 |
| JP | 2004-318034 | A | 11/2004 |
| JP | 2006-221376 | A | 8/2006 |
| JP | 2006-292402 | A | 10/2006 |
| JP | 2008-172406 | A | 7/2008 |
| JP | 2008-269030 | A | 11/2008 |
| JP | 2009-094954 | A | 4/2009 |
| JP | 2011-210205 | A | 10/2011 |
| JP | 2013-88829 | A | 5/2013 |
| JP | 2014-78070 | A | 5/2014 |
| WO | 2013/146432 | A1 | 10/2013 |
| WO | 2014/057835 | A1 | 4/2014 |

OTHER PUBLICATIONS

"ICT o Katsuyo shita Jigyo Keizoku Taisaku", NEC Digital Signage Solution Panel Director, Nov. 10, 2011, cited in ISR (7 pages).

Goto et al., "A Disaster Information Analysis System Based on Question Answering", Journal of Natural Language Processing, vol. 20, No. 3, pp. 367-404, cited in ISR, w/English partial translation (39 pages).

International Search Report, w/English translation and Written Opinion dated Nov. 25, 2014, issued in counterpart International Application No. PCT/JP2014/073329 (10 pages).

Translation of Written Opinion dated Nov. 25, 2014, issued in counterpart International Application No. PCT/JP2014/073329. (5 pages).

Extended {Supplementary} Search Report dated Dec. 8, 2016, issued in European Application No. 14876706.4 (8 pages).

\* cited by examiner

EMERGENCY DECISION-MAKING ASSISTANCE SYSTEM

TECHNICAL FIELD

The present invention relates to an emergency decision-making assistance system for collecting various pieces of information to make a decision for an effective countermeasure in an emergency, for example, at various plants, or in urban areas.

BACKGROUND ART

For example, a nuclear power generation plant is constituted by a reactor, a steam turbine, a generator, and the like. Then, in the case where a pressurized water reactor (PWR) is applied as a reactor, the pressurized water reactor uses light water as a reactor coolant and a neutron moderator to generate high-temperature high-pressure water that does not boil across the reactor core. A steam generator causes this high-temperature high-pressure water (primary cooling water) to exchange heat with secondary cooling water to generate steam. Furthermore, the steam turbine drives a turbine with this steam, and the generator generates power with this driving force.

In such a nuclear power generation plant, when a severe accident has occurred, it is necessary to establish disaster countermeasure offices in various locations, grasp the situation of the accident, and devise a countermeasure. Generally, in a disaster countermeasure office, a large number of persons concerned are summoned, and information that is necessary for instructions such as the understanding of the situation of the plant and the countermeasure flow is presented.

Examples of general decision-making assistance systems include those disclosed in Patent Documents 1 to 3 listed below. For example, in the decision-making assistance system disclosed in Patent Document 1, in order for information that is necessary for decision-making to be distributed to various terminals via a network from a decision-making assistance device, events that are factors for decision-making are detected by an event management unit, and task (job) allocation corresponding to the events and information to be notified are decided using the correlation relationship between pieces of information managed by an information correlation management unit in accordance with the events. Furthermore, examples of techniques for managing information in a disaster include those disclosed in Patent Documents 4 to 6 listed below.

CITATION LIST

Patent Documents

Patent Document 1: Japanese Unexamined Patent Application Publication NO. 2013-088829A
Patent Document 2: Japanese Unexamined Patent Application Publication No. 2014-078070A
Patent Document 3: WO 2014/057835
Patent Document 4: Japanese Unexamined Patent Application Publication No. 2006-292402A
Patent Document 5: Japanese Unexamined Patent Application Publication No. 2011-210205A
Patent Document 6: Japanese Unexamined Patent Application Publication No. 2003-177666A

SUMMARY OF INVENTION

Technical Problem

The above-described decision-making assistance system is intended for assisting a countermeasure for a natural disaster over a wide area, and is connected with a network to distribute various pieces of information to each terminal. Furthermore, since information selected from an extremely large existing database is presented, real-time information necessary for decision-making is not shared. Therefore, there is a risk that the determination of a specific countermeasure may be delayed, and there is also a risk that it may not be possible to respond to an unexpected situation such as information that is not in the database. Also, since each terminal shares the decision-making assistance system, there is a risk that the information distributed to each terminal may become extremely large, and it may become difficult to determine a countermeasure.

To solve the above-described problems, an object of the present invention is to provide an emergency decision-making assistance system that can effectively assist decision-making by obtaining only the up-to-date necessary information.

Solution to Problem

An emergency decision-making assistance system of the present invention for achieving the above-described object is an emergency decision-making assistance system that assists decision-making for a countermeasure in an emergency. Such an emergency decision-making assistance system includes an information management unit operable to generate display data on the basis of emergency information necessary in an emergency and to share the emergency information via, a network; a display unit operable to display a plurality of pieces of the display data generated by the information management unit; a console unit operable to switch between the plurality of pieces of display data displayed on the display unit; and a storage unit configured to store the plurality of pieces of display data generated by the information management unit.

Accordingly, the information management unit generates display data on the basis of emergency information, the display unit displays the plurality of pieces of display data generated by the information management unit, and the console unit switches between the plurality of pieces of display data displayed on the display unit or allows some or all of the plurality of pieces of display data to be displayed at the same time. Furthermore, the information management unit shares information with the other information management unit, via the network. This configuration enables only the up-to-date necessary information to be displayed and confirmed at locations in which the information management units are provided, which effectively assists decision-making.

In the emergency decision-making assistance system of the present invention, the information management unit selects only information necessary for decision-making from among the emergency information to generate the display data, and shares the emergency information via, the network.

Accordingly, generating display data with only information necessary for decision-making and sharing the display data via the network allows only necessary data to be displayed without displaying unnecessary data, which effectively assists decision-making.

In the emergency decision-making assistance system of the present invention, the information necessary for decision-making selected by the information management unit includes the up-to-date information including real-time information.

Accordingly, the information necessary for decision-making including the up-to-date information makes it possible to effectively assist decision-making.

In the emergency decision-making assistance system of the present invention, the information necessary for decision-making selected by the information management unit includes information satisfying a prescribed priority display standard, and display data based on the information is preferentially displayed on the display unit.

Accordingly, the information necessary for decision-making selected by the information management unit including the information satisfying the prescribed priority display standard makes it possible to effectively assist decision-making.

In the emergency decision-making assistance system of the present invention, the information management unit highlights the information satisfying the prescribed priority display standard on the display unit.

Accordingly, the information satisfying the prescribed priority display standard is highlighted on the display unit, which enables an effective notification of important information.

In the emergency decision-making assistance system of the present invention, the information necessary for decision-making selected by the information management unit includes display data obtained by the information management unit organizing the display data stored in the storage unit by countermeasure item for an emergency.

Accordingly, the information necessary for decision-making is organized by countermeasure item for an emergency and displayed, which makes it possible to effectively assist decision-making.

In the emergency decision-making assistance system of the present invention, the information necessary for decision-making selected by the information management unit includes prediction data generated by the information management unit performing a prediction calculation on changes over time on the basis of the emergency information.

Accordingly, for example, when a severe accident has occurred, performing the prediction calculation on changes over time in the accident and displaying the resultant on the display unit makes it possible to effectively assist decision-making for a countermeasure.

The emergency decision-making assistance system of the present invention further includes a synchronization management unit configured to synchronize information with the other information management unit via the network.

Accordingly, since the synchronization management unit synchronizes information with the other information management unit via the network, even if the network is temporarily disconnected and is restored thereafter, the sharing of various pieces of data can be performed appropriately.

In the emergency decision-making assistance system of the present invention, the information management unit is operable to receive prediction data on diffusion of radioactive substance to the atmosphere from a system for prediction of environmental emergency dose information network.

Accordingly, when a severe accident has occurred, for example, this configuration makes it possible to carry out an effective countermeasure for evacuation guidance for residents on the basis of the prediction data on diffusion of radioactive substance to the atmosphere.

In the emergency decision-making assistance system of the present invention, the information management unit is operable to receive plant data in real time from an emergency operation parameter transmission system.

Accordingly, plant data is input in real time from the emergency operation parameter transmission system, which makes it possible to quickly obtain the plant data.

In the emergency decision-making assistance system of the present invention, an input device operable to receive information is connected to the information management unit.

This configuration enables information that cannot be acquired via the network to be managed.

In the emergency decision-making assistance system of the present invention, a plurality of the information management units are provided in the network, and a specified information management unit of the plurality of information management units is operable to forcibly display display data, which has been displayed on the display unit, on the display unit of the other information management unit.

Accordingly, forcibly displaying the display data of the specified information management unit on the display unit of the other information management unit makes it possible to confirm common display data in the plurality of information management units, which makes it possible to effectively assist decision-making for deciding upon a countermeasure.

In the emergency decision-making assistance system of the present invention, a handwriting input unit configured to enable handwritten input with respect to the display unit is provided, and the information management unit is operable to store display data input by handwriting in the storage unit.

This configuration enables the operator to input data on the display by handwriting and to store the handwriting input data in the storage unit, which makes it possible to display a countermeasure to effectively assist decision-making.

Advantageous Effects of Invention

According to the emergency decision-making assistance system of the present invention, the information management unit operable to generate display data on the basis of emergency information and to share the emergency information via the network, the display unit operable to display a plurality of pieces of the display data generated by the information management unit, the console unit operable to switch between the plurality of pieces of display data displayed on the display unit, and the storage unit configured to store the plurality of pieces of display data generated by the information management unit are provided. It is thus possible to display and confirm only the up-to-date necessary information to effectively assist decision-making.

DESCRIPTION OF EMBODIMENTS

Hereinafter, preferred embodiments of the decision-making assistance system according to the present invention will be described in detail with reference to the accompanying drawings. It should be noted that the present invention is not limited by these embodiments, and, when there is a plurality of embodiments, encompasses combinations of these embodiments.

First Embodiment

Figure 1:
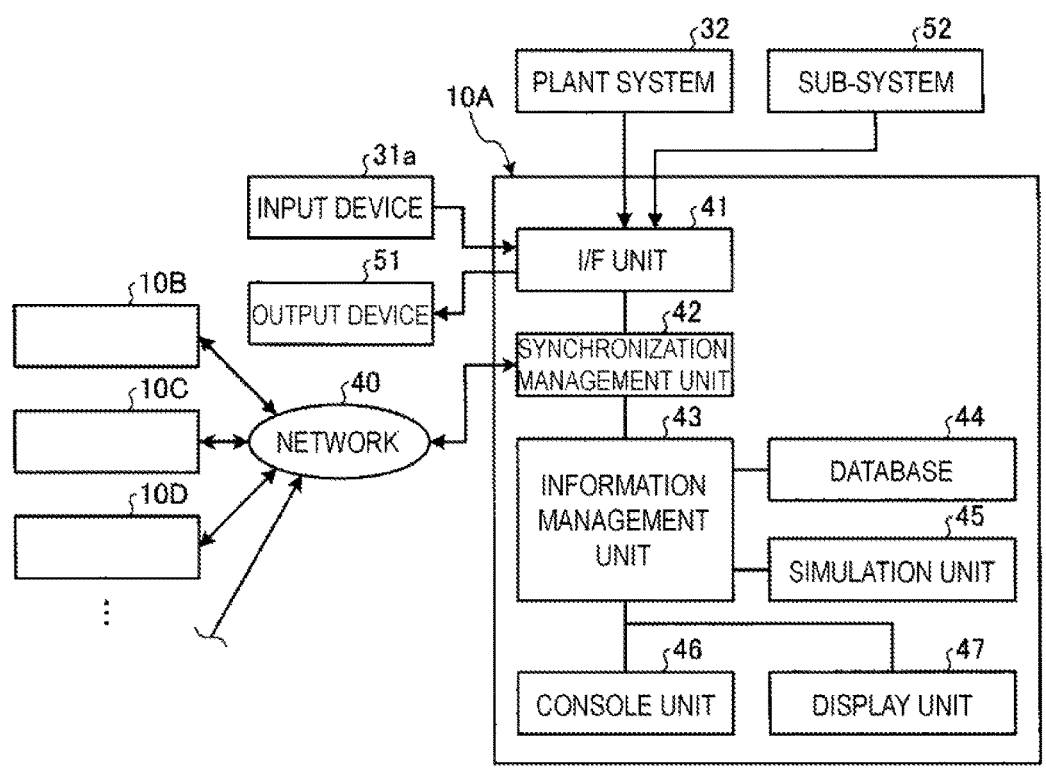
FIG. 1 is a schematic block diagram depicting an emergency decision-making assistance system of a first embodiment.
Figure 2:
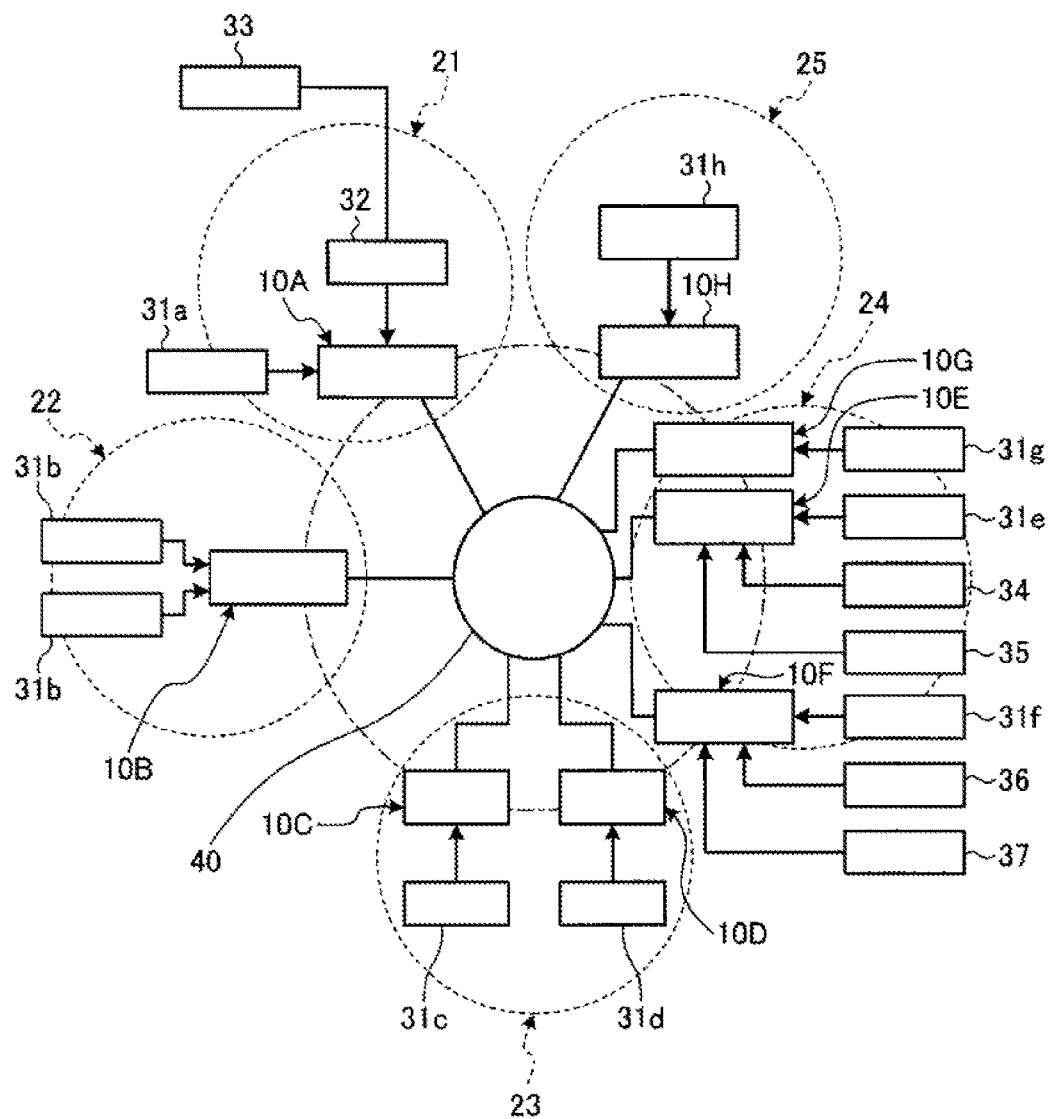
FIG. 2 is a schematic block diagram depicting an arrangement example of the emergency decision-making assistance system of the first embodiment.

FIG. 1 is a schematic block diagram depicting an emergency decision-making assistance system of a first embodiment, and FIG. 2 is a schematic block diagram depicting an arrangement example of the emergency decision-making assistance system of the first embodiment.

In the first embodiment, as depicted in FIG. 2, emergency decision-making assistance systems 10A, 10B, 10C, 10D, 10E, 10F, 10G, and 10H are arranged in a nuclear power generation plant 21, a power company 22, a local self-governing body 23, a country (government policy agency, regulatory agency, and off-site center) 24, and a plant maker 25. The decision-making assistance system 10A arranged in the nuclear power generation plant 21 has an input device 31a and a plant system 32 connected thereto.

The decision-making assistance system 10B arranged in the power company 22 has a plurality of input devices 31b connected thereto. The decision-making assistance systems 10C and 10D arranged in the local self-governing body 23 have input devices 31c and 31d connected thereto, respectively. The decision-making assistance systems 10E, 10F, and 10G arranged in the country (government policy agency, regulatory agency, and off-site center) 24 have input devices 31e, 31f, and 31g connected thereto, respectively. Furthermore, the decision-making assistance system 10E arranged in the government policy agency 24 has an emergency information network system 34 and a nationwide instantaneous warning system 35 connected thereto. In addition, the decision-making assistance system 10F arranged in the government policy agency 24 has an emergency response support system 36 and a system for prediction of environmental emergency dose information network 37 connected thereto. The decision-making assistance system 10H arranged in the plant maker 25 has an input device 31h connected thereto.

The decision-making assistance systems 10A, 10B, 10C, 10D, 10E, 10F, and 10G are able to share various pieces of information by being connected to a integrated reactor disaster network 40. Furthermore, the integrated reactor disaster network 40 has an emergency operation parameter transmission system 33, the emergency response support system 36, and the system for prediction of environmental emergency dose information network 37 connected thereto.

It should be noted that a decision-making assistance system may be arranged in a nuclear power generation plant separate from the nuclear power generation plant 21 in which the decision-making assistance system 10A is arranged, and connected to the integrated reactor disaster network 40.

Here, the decision-making assistance systems 10A, 10B, 10C, 10D, 10E, 10F, 10G, and 10H will be described; however, because the decision-making assistance systems 10A, 10B, 10C, 10D, 10E, 10F, 10G and 10H have substantially the same configuration, the decision-making assistance system 10A arranged in the nuclear power generation plant 21 will be described in detail.

As depicted in FIG. 1, the decision-making assistance system 10A has an I/F unit (input/output unit) 41, a synchronization management unit 42, an information management unit 43, a database (storage unit) 44, a simulation unit 45, a console unit 46, and a display unit 47.

The I/F unit 41 has the input device (personal computer, mobile terminal, or the like) 31a, an output device (printer, mobile terminal, or the like) 51, and the synchronization management unit 42 connected thereto. An operator can use this input device 31a to input, for example, information received by phone or information received by facsimile. Furthermore, the I/F unit 41 has the plant system 32 and a sub-system 52 connected thereto. The plant system 32 manages various pieces of data of a reactor (reactor design data, measured reactor temperatures, and the like), and outputs various pieces of data of the nuclear power generation plant 21 to the decision-making assistance system 10A as required. The sub-system 52 manages various pieces of data (meteorological data and the like) other than that of the nuclear power generation plant 21, and outputs these various pieces of data to the decision-making assistance system 10A as required.

The synchronization management unit 42 shares information with the other decision-making assistance systems 10B, 10C, 10D, 10E, 10F, 10G, and 10H. For example, the synchronization management unit 42 transmits and receives various pieces of data via the integrated reactor disaster network 40 to update data. Furthermore, the synchronization management unit 42, when the integrated reactor disaster network 40 is disconnected and connected again after the lapse of a prescribed period, updates data on the basis of data received from the other decision-making assistance systems 10B, 10C, 10D, 10E, 10F, 10G, and 10H.

The information management unit 43 processes various pieces of data input from outside to generate display data that can be displayed. For example, on the basis of chronological reactor temperature data received from the plant system 32, the average temperature in a prescribed period and temperature deviations are generated and managed. The database 44 stores, for example, various pieces of data input from outside and display data generated by the information management unit 43. The information management unit 43 is permitted to read such data.

Furthermore, the information management unit 43 is connected to the decision-making assistance system 10E via the integrated reactor disaster network 40, enabling various pieces of data of the emergency information network system 34 and the nationwide instantaneous warning system 35 to be input to the information management unit 43. Furthermore, the information management unit 43 is connected to the decision-making assistance system 10F via the integrated reactor disaster network 40, enabling various pieces of data of the emergency response support system 36 and the system for prediction of environmental emergency dose information network 37 to be input to the information management unit 43.

The simulation unit 45 performs a prediction calculation on changes over time in the plant on the basis of plant data collected by the information management unit 43 to generate plant prediction data.

The display unit 47 is operable to display a plurality of pieces of display data generated by the information management unit 43. In this case, the display unit 47 is operable to display a plurality of pieces of data on a screen in a parallel or superimposed manner. Furthermore, the display unit 47 is operable to display the plant prediction data generated by the simulation unit 45. The use of the console unit 46 allows the plurality of pieces of display data and the plant prediction data to be selectively displayed on the display unit 47. In other words, the operator, operating the console unit 46, is able to selectively switch between the display data and the plant prediction data that the operator wishes to confirm.

It should be noted that the console unit 46 and the display unit 47 are, for example, a touch panel, and the operator, touch-operating the panel, is able to switch between the display data and the plant prediction data. It should be noted that the console unit 46 and the display unit 47 may be constituted by a display and a keyboard rather than a touch panel.

In the emergency decision-making assistance system 10A configured in this way, for example, when a severe accident has occurred, first, a reactor trip signal is input from the plant system 32. Thereupon, the information management unit 43 collects necessary plant data from the plant system 32, and generates display data on the basis of the collected plant data. The display unit 47 then displays this display data. Furthermore, the information management unit 43 processes information input from the input device 31a and information input via the integrated reactor disaster network 40 to generate display data, and the display unit 47 displays this display data.

The decision-making assistance systems 10A, 10B, 10C, 10D, 10E, 10F, 10G, and 10H arranged in the nuclear power generation plant 21, the power company 22, the local self-governing body 23, and the country 24 are, as described above, operable to share various pieces of information with each other via the integrated reactor disaster network 40, and display necessary information in the decision-making assistance systems 10A, 10B, 10C, 10D, 10E, 10F, 10G, and 10H. In other words, it becomes possible for a countermeasure that have to be decided upon by the nuclear power generation plant 21, the power company 22, the local self-governing body 23, and the country 24 to be carried out on the basis of necessary information.

In this way, the emergency decision-making assistance system of the first embodiment is provided with: the information management unit 43 that is operable to generate display data on the basis of plant data and share information via a network; the display unit 47 that is operable to display a plurality of pieces of the display data generated by the information management unit 43; the console unit 46 that is operable to switch between the plurality of pieces of display data displayed on the display unit 47; and the database 44 that stores the plurality of pieces of display data generated by the information management unit 43.

Consequently, the information management unit 43 generates display data on the basis of plant data, the display unit 47 displays a plurality of pieces of the display data generated by the information management unit 43, and the console unit 46 switches between the plurality of pieces of display data to be displayed on the display unit 47 or allows some or all of the plurality of pieces of display data to be displayed at the same time. Furthermore, the information management unit 43 shares information with other information management units 43 via the integrated reactor disaster network 40. This configuration enables only the up-to-date necessary information to be displayed and confirmed at a plurality of locations in which the information management units 43 are provided, which effectively assists decision-making.

In the emergency decision-making assistance system of the first embodiment, there is a case where the information management unit 43, upon receiving a trip signal from the plant system 32, collects necessary plant data. In such a case, display data is generated on the basis of the collected plant data. Accordingly, the information management unit 43 starts collecting the necessary plant data with the trip signal serving as a trigger, which enables data to be rapidly collected in a plant emergency.

In the emergency decision-making assistance system of the first embodiment, the information management unit 43 performs a prediction calculation on changes over time in a plant on the basis of collected plant data to generate plant prediction data, and the display unit 47 displays the conditions of this plant. Accordingly, for example, when a severe accident has occurred, performing a prediction calculation on changes over time in a plant and displaying the resultant on the display unit 47 makes it possible to effectively assist decision-making for a countermeasure.

In the emergency decision-making assistance system of the first embodiment, the synchronization management unit 42, which synchronizes information with the other information management units 43 via the integrated reactor disaster network 40, is provided. Accordingly, since the synchronization management unit 42 synchronizes information with the other information management units 43 via the integrated reactor disaster network 40, even if the integrated reactor disaster network 40 is temporarily disconnected and thereafter the integrated reactor disaster network 40 is restored, the sharing of various pieces of data can be performed appropriately.

In the emergency decision-making assistance system of the first embodiment, the information management unit 43 is operable to receive prediction data on diffusion of radioactive substance to the atmosphere from the system for prediction of environmental emergency dose information network 37. Accordingly, when a severe accident has occurred, for example, this configuration makes it possible to carry out an effective countermeasure for evacuation guidance for residents on the basis of the prediction data on diffusion of radioactive substance to the atmosphere.

In the emergency decision-making assistance system of the first embodiment, the information management unit 43 has the input device 31a (31b, 31c, 31d, 31e, 31f, 31g, and 31h) connected thereto, the input device 31a being operable to receive information. This configuration enables information that cannot be acquired via the integrated reactor disaster network 40 to be managed.

Second Embodiment

Figure 3:
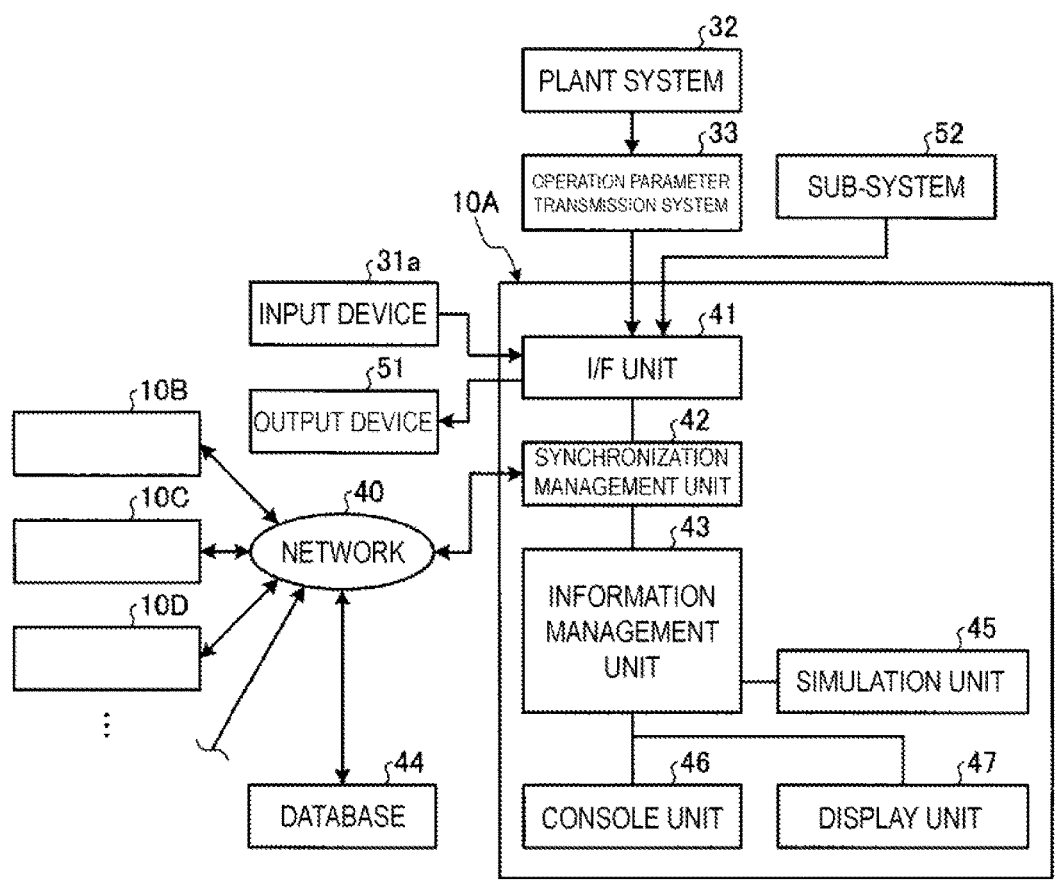
FIG. 3 is a schematic block diagram depicting an emergency decision-making assistance system of a second embodiment.
Figure 4:
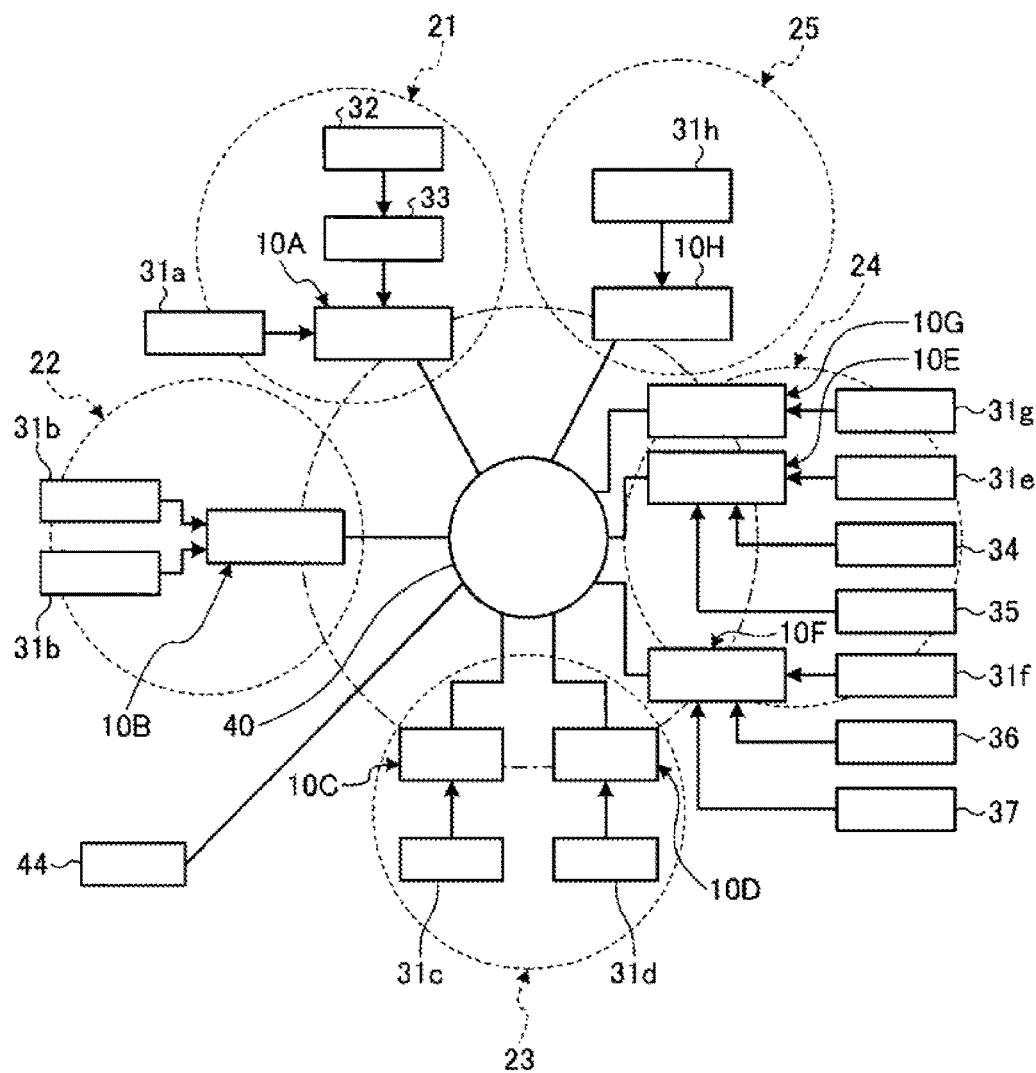
FIG. 4 is a schematic block diagram depicting an arrangement example of the emergency decision-making assistance system of the second embodiment.
Figure 5:
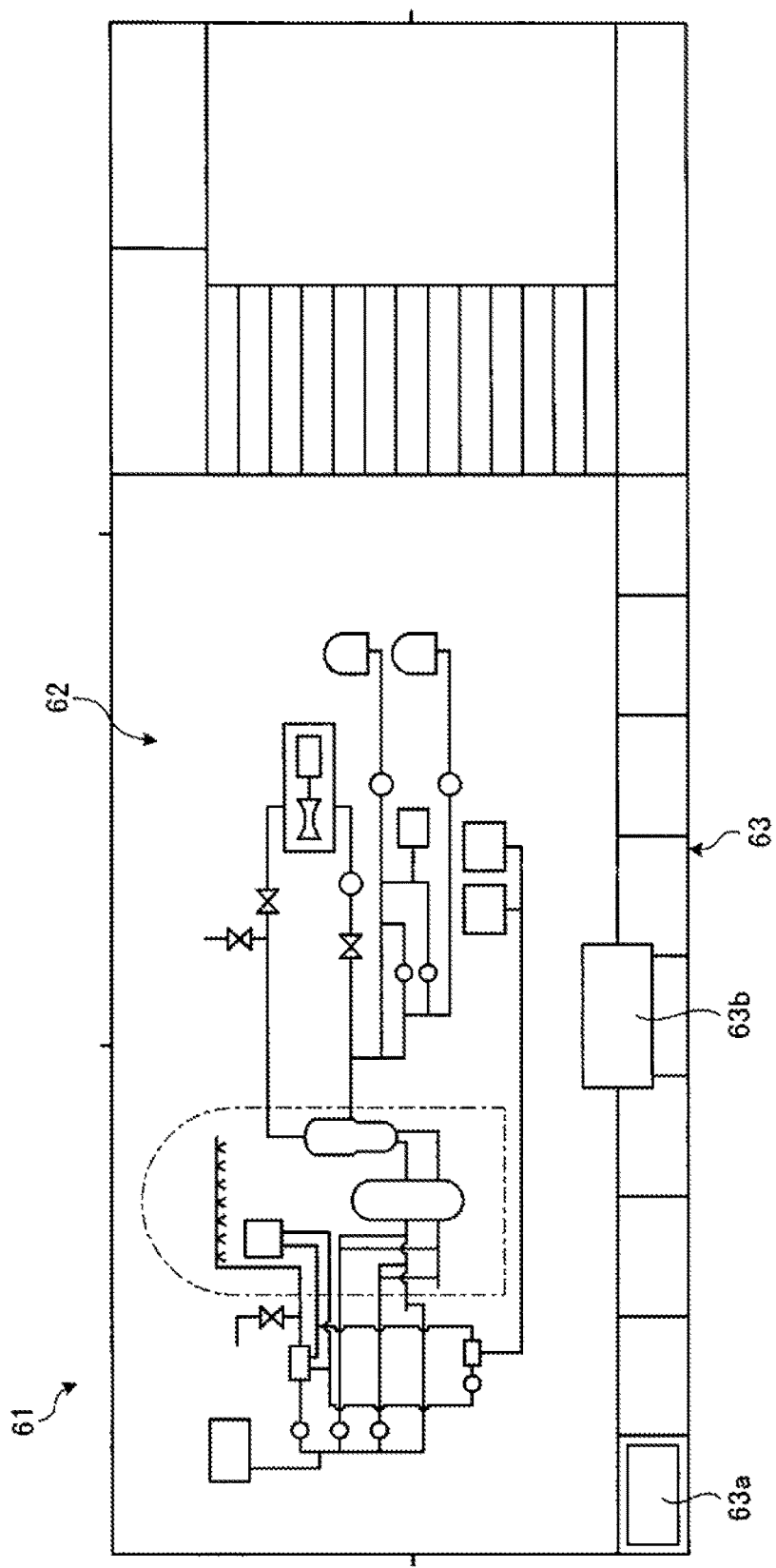
FIG. 5 is a schematic diagram depicting a console unit and a display unit of the emergency decision-making assistance system.

FIG. 3 is a schematic block diagram depicting an emergency decision-making assistance system of a second embodiment, FIG. 4 is a schematic block diagram depicting an arrangement example of the emergency decision-making assistance system of the second embodiment, and FIG. 5 is a schematic diagram depicting a console unit and a display unit of the emergency decision-making assistance system. It should be noted that the same reference numerals are given to members having the same functions as in the embodiment described above and detailed descriptions thereof are omitted.

In the second embodiment, as depicted in FIG. 4, emergency decision-making assistance systems 10A, 10B, 10C, 10D, 10E, 10F, 10G, and 10H are arranged in a nuclear power generation plant 21, a power company 22, a local self-governing body 23, a country (government policy agency, regulatory agency, and off-site center) 24, and a plant maker 25. Here, the connection mode for these decision-making assistance systems 10A, 10B, 10C, 10D, 10E, 10F, and 10G is the same as in the first embodiment, and therefore a detailed description thereof is omitted. The decision-making assistance systems 10A, 10B, 10C, 10D, 10E, 10F, and 10G are able to share various pieces of information by being connected to a integrated reactor disaster network 40.

The emergency decision-making assistance system 10A, as depicted in FIG. 3, includes an I/F unit 41, a synchronization management unit 42, an information management unit 43, a database 44, a simulation unit 45, a console unit 46, and a display unit 47.

The I/F unit 41 has an input device 31a, an output device 51, and the synchronization management unit 42 connected thereto. Furthermore, the I/F unit 41 has a plant system 32 connected thereto via an emergency operation parameter transmission system 33, and has a sub-system 52 connected thereto. The plant system 32 manages various pieces of data of a reactor (data such as various temperatures and flow rates within the reactor), and outputs various pieces of data of the nuclear power generation plant 21 to the decision-making assistance system 10A as required. The emergency operation parameter transmission system 33 outputs various operation parameters to the decision-making assistance system 10A in a plant emergency.

The information management unit 43 is operable to generate display data on the basis of necessary emergency information in an emergency and share the emergency information via the integrated reactor disaster network 40. Here, examples of the emergency information will be described below.

1. Personnel resource management information—input by the input device 31a

2. Logistical support (transportation of supplies) information to be input by the input device 31a 3. Radiation monitoring (surrounding area, on-site, in buildings) information—input from monitoring posts via the integrated reactor disaster network 40

4. Meteorological information, wind direction information, earthquake information, tidal wave information—input via the integrated reactor disaster network 40

5. Information regarding damage status within a plant (camera images, landslides, restoration status)—input by the console unit 46

6. Plant reactor core information (fuel temperature, reactor internal temperature, reactor internal pressure, and the like)—input from the emergency operation parameter transmission system 33

7. Plant status development prediction information input from the simulation unit 45

8. Power transmission information of areas surrounding the plant—input from the power company via the integrated reactor disaster network 40

9. Plant internal response status (status of portable equipment) information—input by the input device 31a 10. Information on documents to be archived such as nuclear reactor design drawings—input from the database 44 via the integrated reactor disaster network 40

11. Task management information—input by the input device 31a

12. Fax image information and the like—input by the input device 31a

The information management unit 43 selects only information necessary for decision-making from among this emergency information to generate display data, and shares the display data with the other decision-making assistance systems 10B, 10C, 10D, 10E, 10F, 10G, and 10H via the integrated reactor disaster network 40. In other words, the emergency decision-making assistance systems 10A, 10B, 10C, 10D, 10E, 10F, 10G, and 10H are arranged in different locations, such as the nuclear power generation plant 21, the power company 22, the local self-governing body 23, the country 24, and the plant maker 25, which results in necessary emergency information being different. Therefore, the decision-making assistance systems 10A, 10B, 10C, 10D, 10E, 10F, 10G, and 10H assign degrees of priority to the emergency information in advance, and select and display only information having a high degree of priority.

In this case, information necessary for decision-making selected by the information management unit 43 includes the up-to-date information including real-time information. In other words, although various pieces of emergency information are input to the information management unit 43 from the console unit 46 or via the integrated reactor disaster network 40 as required, the emergency information is saved in the database 44 together with a date and time, and the up-to-date emergency information is always displayed. Examples of the real-time information include plant reactor core information (fuel temperature, reactor internal temperature, reactor internal pressure, and the like) input from the emergency operation parameter transmission system 33, and radiation monitoring (surrounding area, on-site, in buildings) information input via the integrated reactor disaster network 40.

Furthermore, the information necessary for the decision-making selected by the information management unit 43 includes information satisfying a prescribed priority display standard, and display data based upon this information is preferentially displayed on the display unit 47. Here, the priority display standard corresponds to information having a high degree of danger or information having a high degree of importance. For example, this information is preferentially displayed when, in a plant, the rate of change of each of the fuel temperature, the reactor internal temperature, and the reactor internal pressure has exceeded a preset standard value. Furthermore, this information is preferentially displayed when the meteorological state such as the amount of precipitation, the wind speed, or the seismic intensity has fluctuated considerably. Furthermore, this information is preferentially displayed when the air dose rate, which constitutes a part of the radiation monitoring (surrounding area, on-site, in buildings) information, has exceeded a preset standard value. Furthermore, information from a preset designated agency (for example, the country 24) is preferentially displayed.

The information management unit 43, when information satisfying the prescribed priority display standard is displayed on the display unit 47, highlights the information on the display unit 47 in accordance with the corresponding degree of priority (degree of importance). As described above, the console unit 46 and the display unit 47 correspond to a display 61 in which a plurality of liquid-crystal touch panels are combined as depicted in FIG. 5. This display 61 is formed of, for example, touch panels arranged in as three by two layout.

The display 61 has a main screen 62 and a lower sub-screen 63. The main screen 62 is operable to display, for example, display data indicating a cooling system and a power supply system in the nuclear power generation plant 21 with images and numerical values. Furthermore, the main screen 62 is operable to display not only the cooling system and the power supply system in the nuclear power generation plant 21, but also the above-described various pieces of emergency information. The sub-screen 63 is operable to display all display data (emergency information). This configuration enables the operator to touch display data displayed on the sub-screen 63 to switch display data displayed on the main screen 62 to the display data that has been touched on the sub-screen 63.

Then, the information management unit 43, when the degree of priority of prescribed information that has been input is high, highlights display data of a high degree of priority being displayed on the sub-screen 63. Specifically, the degree of priority (degree of importance) of the emergency information is set to three levels. Display data corresponding to information of a first level is not highlighted, display data 63a corresponding to information of a second level is highlighted with a colored frame being added thereto, and display data 63b corresponding to information of a third level is highlighted in the form of a pop up.

Furthermore, the information management unit 43 displays display data, which is necessary for decision-making, obtained by organizing emergency information stored in the database 44 by countermeasure item. Here, the countermeasure items are those described below.

1. Evacuation time
2. Evacuation route
3. Evacuation site
4. Work procedure
5. Personnel distribution
6. Worker route
7. Power supply route
8. Type and amount of supplies to be transported The database 44 has a large amount of emergency information stored therein; however, the information management unit 43 displays, as display data, only the emergency information necessary for deciding upon the countermeasure items, from the large amount of emergency information stored in the database 44.

Furthermore, the information necessary for the decision-making to be selected by the information management unit 43 includes prediction data generated by the information management unit 43 performing a prediction calculation on changes over time on the basis of the emergency information. The simulation unit 45 generates plant prediction data by performing a prediction calculation on changes over time in the plant on the basis of plant data collected by the information management unit 43. Furthermore, the information management unit 43 is operable to display the plant prediction data obtained by the simulation unit 45 performing the prediction calculation.

In the plant emergency decision-making assistance system 10A configured in this manner, when a severe accident has occurred, the information management unit 43 collects necessary plant data (emergency information) from the plant system 32, and simultaneously collects various pieces of emergency information via the integrated reactor disaster network 40. Then, the information management unit 43 generates display data on the basis of the collected various pieces of emergency information, and the display unit 47 displays this display data. Furthermore, the information management unit 43 processes information input from the input device 31a to generate display data, and the display unit 47 displays this display data.

The decision-making assistance systems 10A, 10B, 10C, 10D, 10E, 10F, 10G, and 10H arranged in the nuclear power generation plant 21, the power company 22, the local self-governing body 23, and the country 24, as described above, share various pieces of information with each other via the integrated reactor disaster network 40, and display necessary information in the decision-making assistance systems 10A, 10B, 10C, 10D, 10E, 10F, 10G, and 10H. In other words, it becomes possible for a countermeasure that have to be decided upon in the nuclear power generation plant 21, the power company 22, the local self-governing body 23, and the country 24 to be carried out on the basis of necessary information.

In this way, the emergency decision-making assistance system of the second embodiment is provided with: the information management unit 43 that is operable to generate display data on the basis of emergency information and share information via the integrated reactor disaster network 40; the display unit 47 that is operable to display a plurality of pieces of the display data generated by the information management unit 43; the console unit 46 that is operable to switch between the plurality of pieces of display data displayed on the display unit 47; and the database 44 that stores the plurality of pieces of display data generated by the information management unit 43.

This configuration enables only the up-to-date necessary information to be displayed and confirmed at a plurality of locations in which the information management units 43 are provided, which effectively assists decision-making.

In the emergency decision-making assistance system of the second embodiment, the information management unit 43 selects only the information necessary for decision-making from among the emergency information to generate the display data, and shares the emergency information via the integrated reactor disaster network 40. This configuration allows only necessary data to be displayed without displaying unnecessary data, which effectively assists decision-making.

In the emergency decision-making assistance system of the second embodiment, information necessary for decision-making M be selected by the information management unit 43 includes the up-to-date information including real-time information. This configuration makes it possible to effectively assist decision-making on the basis of the up-to-date information.

In the emergency decision-making assistance system of the second embodiment, the information necessary for decision-making to be selected by the information management unit 43 includes information satisfying a prescribed priority display standard, and display data based upon this information is preferentially displayed on the display unit 47. Accordingly, the preferential display of information satisfying the prescribed priority display standard makes it possible to effectively assist decision-making.

In the emergency decision-making assistance system of the second embodiment, the information management unit 43 highlights information satisfying the prescribed priority display standard on the display unit 47. Accordingly, information satisfying the prescribed priority display standard is highlighted on the display unit 47, which enables an effective notification of important information.

In the emergency decision-making assistance system of the second embodiment, information necessary for decision-making, to be selected by the information management unit 43 includes display data obtained by the information management unit 43 organizing the display data stored in the database 44 by countermeasure item for an emergency. Accordingly, the information necessary for decision-making is organized by countermeasure item in an emergency and displayed, which makes it possible to effectively assist decision-making.

In the emergency decision-making assistance system of the second embodiment, information necessary for decision-making to be selected by the information management unit 43 includes prediction data generated by the information management unit 43 performing a prediction calculation on changes over time on the basis of the emergency information. When a severe accident has occurred, the prediction calculation is performed on changes over time in the accident and the resultant is displayed on the display unit 47, which makes it possible to effectively assist decision-making for deciding upon a countermeasure.

In the emergency decision-making assistance system of the second embodiment, the information management unit 43 is operable to receive plant data in real time from the emergency operation parameter transmission system 33. Accordingly, plant data is input in real time from the emergency operation parameter transmission system, which makes it possible to quickly obtain the plant data.

Third Embodiment

Figure 6:
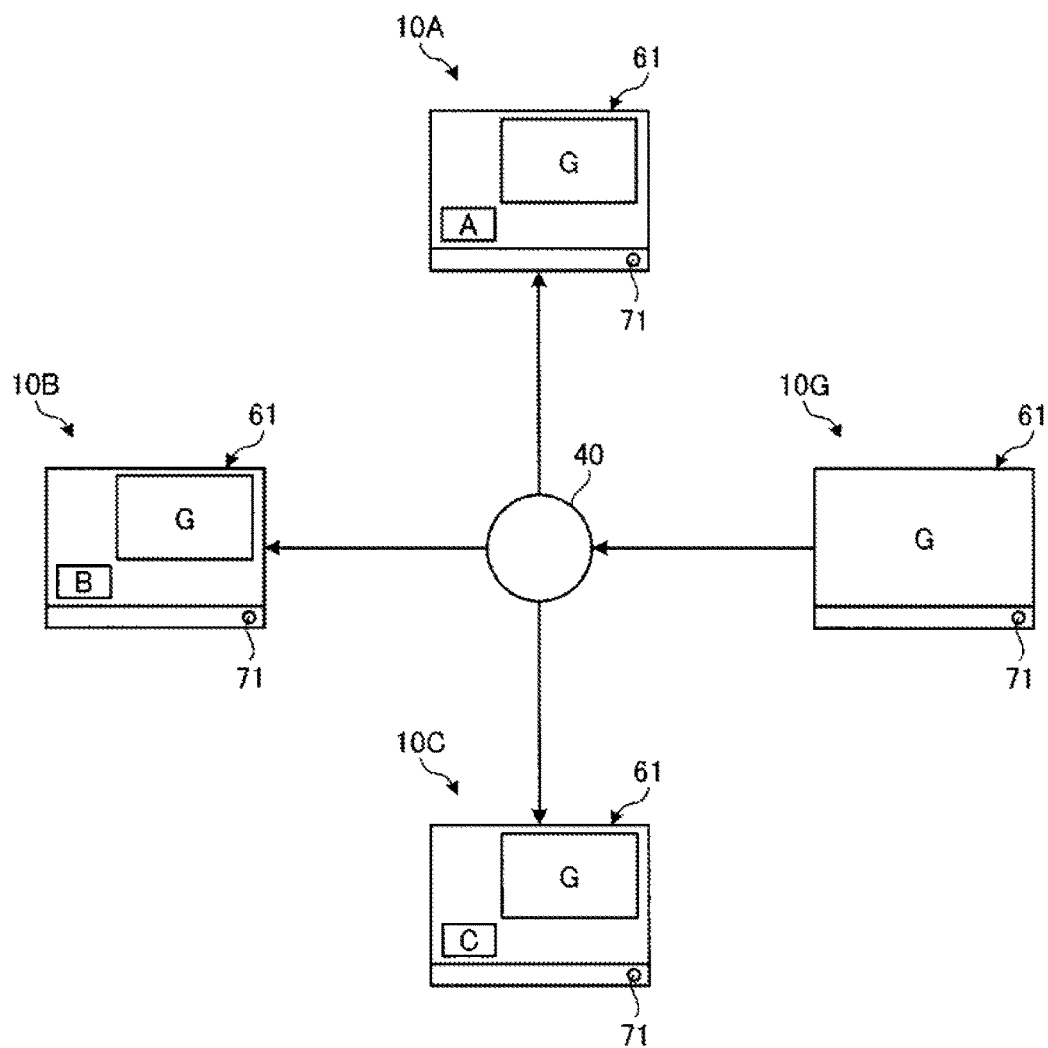
FIG. 6 is a schematic block diagram depicting an emergency decision-making assistance system of a third embodiment.

FIG. 6 is a schematic block diagram depicting an emergency decision-making assistance system of a third embodiment. It should be noted that the same reference numerals are given to members having the same functions as in the embodiments described above and detailed descriptions thereof are omitted.

In the third embodiment, as depicted in FIG. 6, for example, four emergency decision-making assistance systems 10A, 10B, 10C, and 10G are operable to share various pieces of information via a integrated reactor disaster network 40. Here, the emergency decision-making assistance systems 10A, 10B, 10C, and 10G correspond to a nuclear power generation plant 21, a power company 22, a local self-governing body 23, and a country 24, respectively.

In the present embodiment, an information management unit 43 (see FIG. 3) is provided in each of the emergency decision-making assistance systems 10A, 10B, 10C, and 10G, and a specific information management unit 43 is operable to forcibly display display data, which has been displayed on a display unit 47 thereof, on a display unit 47 of another information management unit 43. For example, display data A is displayed on a display 61 of the emergency decision-making assistance system 10A, display data B is displayed on a display 61 of the emergency decision-making assistance system 10B, display data C is displayed on a display 61 of the emergency decision-making assistance system 10C, and display data G is displayed on a display 61 of the emergency decision-making assistance system 10G.

At such time, with the emergency decision-making assistance system 10G of the country 24 having authority, if a forcible display switch 71 is pressed, the display data G is displayed on the displays 61 of the other emergency decision-making assistance systems 10A, 10B, and 10C. At such time, the display data G may be displayed on the whole screen of each of the displays 61 of the emergency decision-making assistance systems 10A, 10B, and 10C, or the display data G may be displayed on part of the screen of each of the displays 61 of the emergency decision-making assistance systems 10A, 10B, and 10C.

It should be noted that a specific information management unit 43 needs authority to forcibly display display data on the display units 47 of other information management units 43. The emergency decision-making assistance system 10A, 10B, 10C, or 10G having the authority may be specified in advance, or the authority may be switched.

In this way, in the emergency decision-making assistance system of the third embodiment, a specific information management unit 43 is operable to forcibly display the display data, which has been displayed on the display unit 47 thereof, on the display unit 47 of another information management unit 43. This configuration enables common display data to be confirmed in a plurality of information management units 43, which makes it possible to effectively assist decision-making for deciding upon a countermeasure.

Fourth Embodiment

Figure 7:
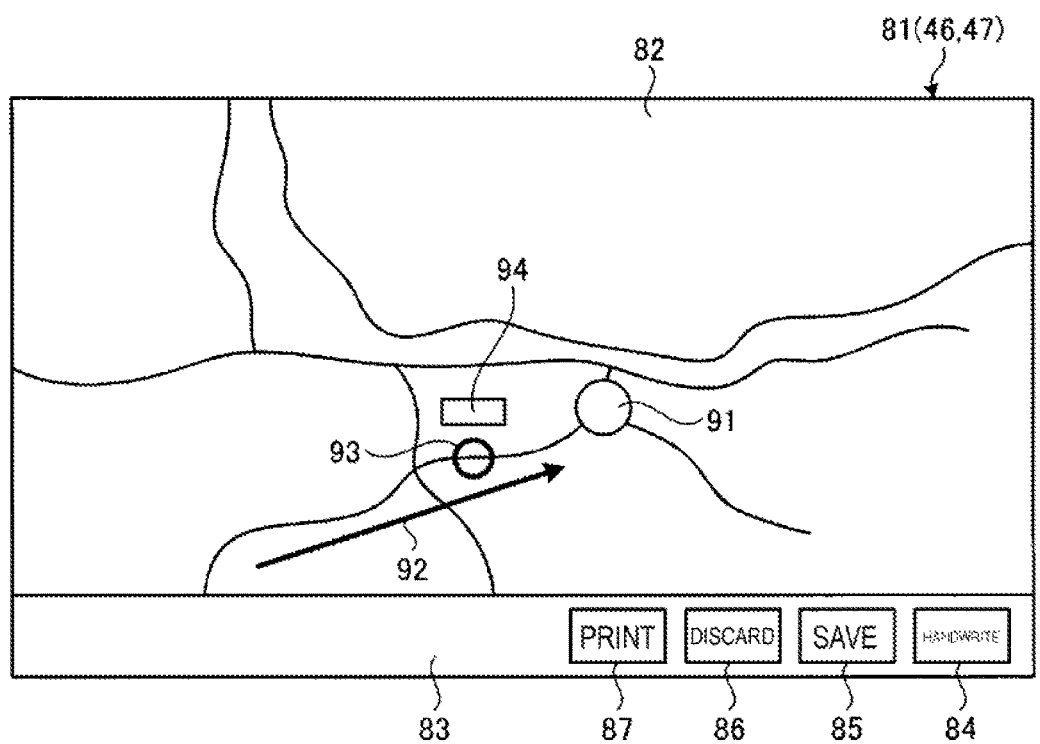
FIG. 7 is a schematic block diagram depicting an emergency decision-making assistance system of a fourth embodiment.

FIG. 7 is a schematic block diagram depicting an emergency decision-making assistance system of a fourth embodiment. It should be noted that the same reference numerals are given to members having the same functions as in the embodiments described above and detailed descriptions thereof are omitted.

In the fourth embodiment, as depicted in FIG. 7, a console unit 46 and a display unit 47 correspond to a display 81 in which a plurality of liquid-crystal touch panels are combined. This display 81 has a main screen 82 and a lower sub-screen 83. In the sub-screen 83, a handwriting input button 84, a save button 85, a discard button 86, and a print button 87 are provided. In other words, in an information management unit 43 (see FIG. 3), the handwriting input switch (handwriting input unit) 84 that allows for handwriting input with respect to the display 81 (display unit 47) is provided, and the save button 85 that allows display data input by handwriting to be stored in a database 44 is provided.

For example, with a transportation route for relief supplies to a nuclear power generation plant 91 shown on a map displayed on the main screen 82, switch to a handwriting input mode made through the press of the handwriting input button 84 enables a specific transportation route to be handwritten in the form of an arrow 92 with a dedicated pen (not depicted) and enables the current position 93 of a transportation vehicle and the date and time 94 to be handwritten. Furthermore, the press of the save button 85 enables the handwritten input data together with the map to be save in the database 44. Furthermore, the press of the discard button $6 enables the handwritten input data to be discarded without saving the data. Furthermore, the press of the print button 87 enables the handwritten input data together with the map to be printed.

In this way, in the emergency decision-making assistance system of the fourth embodiment, the handwriting input button 84 that allows for handwriting input with respect to the display 81 is provided, and the information management unit 43 is operable to store display data that has been input by handwriting in the database 44. This configuration enables the operator to input data on the display 81 by handwriting and to store the handwriting input data in the database 44, which makes it possible to display a countermeasure to effectively assist decision-making.

It should be noted that, in the above-described embodiments, configurations in which the decision-making assistance system of the present invention has been applied to a nuclear power generation plant have been described; however, the decision-making assistance system may be applied to a thermal power generation plant, a chemical plant, an environmental plant, or the like. Furthermore, the decision-making assistance system of the present invention may be applied to not only various plant accidents but also an incident, for example, a natural disaster such as an earthquake, typhoon, or tidal wave in an urban area or the like, or a disaster such as an airplane crash or a missile attack. In addition, the decision-making assistance system of the present invention may be applied to not only an actual accident or disaster but also training for an accident, disaster, or the like.

REFERENCE SIGNS LIST 10A, 10B, 10C, 10D, 10E, 10F, 10G, 10H Decision-making, assistance system
21 Nuclear power generation plant
22 Power company
23 Local self-governing body
24 Country (government policy agency, regulatory agency, and off-site center)
25 Plant maker
31a, 31b, 31c, 31d, 31e, 31f, 31g Input device
32 Plant system
33 Emergency operation parameter transmission system
34 Emergency information network system
35 Nationwide instantaneous warning system
36 Emergency response support system
37 System for prediction of environmental emergency dose information network
40 Integrated reactor disaster network
41 I/F unit (input/output unit)
42 Synchronization management unit
43 Information management unit
44 Database (storage unit)
45 Simulation unit
46 Console unit
47 Display unit
51 Output device
61, 81 Display
71 Forcible display switch
84 Handwriting input button
85 Save button
86 Discard button
87 Print button

The invention claimed is:

1. An emergency decision-making assistance system of a nuclear power generation plant that assists decision-making for a countermeasure in an emergency of a nuclear power generation plant, the system having an emergency decision-making assistance device comprising:
an input unit;
an information management device connected to the input unit and configured to acquire emergency information from the nuclear power generation plant, the information management device having a function of generating display data on a basis of the emergency information and generating the display data on a basis of information input from an input device, so that the information management unit generates display data on the basis of the emergency information and shares the emergency information with other decision-making assistance devices via a network;
a display unit configured to display a plurality of pieces of the display data generated by the information management device;
a console unit configured to switch between the plurality of pieces of display data displayed on the display unit; and
a storage unit configured to store the plurality of pieces of display data generated by the information management device, wherein
the information management device is configured to assign degrees of priority to the emergency information to select and display only information having a high degree of priority on the display unit, so that the information management device displays information necessary for decision-making which is different from information displayed by other decision-making assistance devices.

2. The emergency decision-making assistance system according to claim 1, wherein
the information management device selects only emergency information necessary for decision-making from among the emergency information to generate the display data, and shares the emergency information via the network.

3. The emergency decision-making assistance system according to claim 2, wherein
the information necessary for decision-making selected by the information management device includes up-to-date information including real-time information.

4. The emergency decision-making assistance system according to claim 2, wherein
the emergency information necessary for decision-making selected by the information management device includes information satisfying a prescribed priority display standard, and the display data based on the information is preferentially displayed on the display unit.

5. The emergency decision-making assistance system according to claim 4, wherein
the information management device highlights the information satisfying the prescribed priority display standard on the display unit.

6. The emergency decision-making assistance system according to claim 2, wherein
the emergency information necessary for decision-making selected by the information management device includes display data obtained by the information management unit organizing the display data stored in the storage unit by countermeasure item for an emergency.

7. The emergency decision-making assistance system according to claim 2, wherein
the emergency information necessary for decision-making selected by the information management device includes prediction data generated by the information management device performing a prediction calculation on changes over time on the basis of the emergency information.

8. The emergency decision-making assistance system according to claim 1, further comprising a synchronization management unit configured to synchronize information with another information management device via the network.

9. The emergency decision-making assistance system according to claim 1, wherein
the information management device is operable to receive prediction data on diffusion of radioactive substance to an atmosphere from a system for prediction of environmental emergency dose information network.

10. The emergency decision-making assistance system according to claim 1, wherein
the information management device is operable to receive plant data in real time from an emergency operation parameter transmission system.

11. The emergency decision-making assistance system according to claim 1, wherein
an input device operable to receive information is connected to the information management device.

12. The emergency decision-making assistance system according to claim 1, wherein
a plurality of the information management devices are provided in the network, and a specified information management device of the plurality of information management devices is operable to forcibly display the display data displayed on the display unit on a display unit of another information management device.

13. The emergency decision-making assistance system according to claim 1, wherein
a handwriting input unit configured to enable handwritten input with respect to the display unit is provided, and the information management device is operable to store display data input by handwriting in the storage unit.

14. The emergency decision-making assistance system according to claim 1, having a plurality of emergency decision-making assistance devices.

15. The emergency decision-making assistance system according to claim 1, wherein, the information management device is configured to forcibly display the display data on display units of other information management devices.

16. The emergency decision-making assistance system according to claim 1, wherein,
the display unit has a main screen and a sub screen, and
the information management device is configured to display display data indicating a cooling system and a power supply system in the nuclear power generation plant on the main screen, and to display display data of all the emergency information on the sub screen, the information management device display, when the emergency information on the sub screen is selected by the console unit, the emergency information selected on the main screen.

* * * * *